June 14, 1932. H. D. WELLS 1,862,643
PROPORTIONING AND METERING APPARATUS
Filed May 28, 1931 2 Sheets-Sheet 1
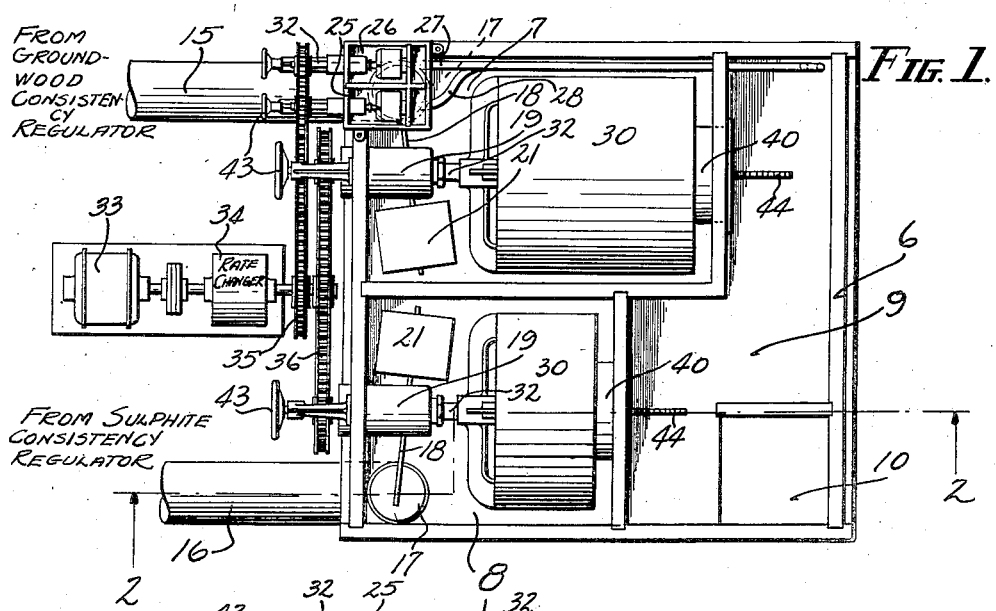
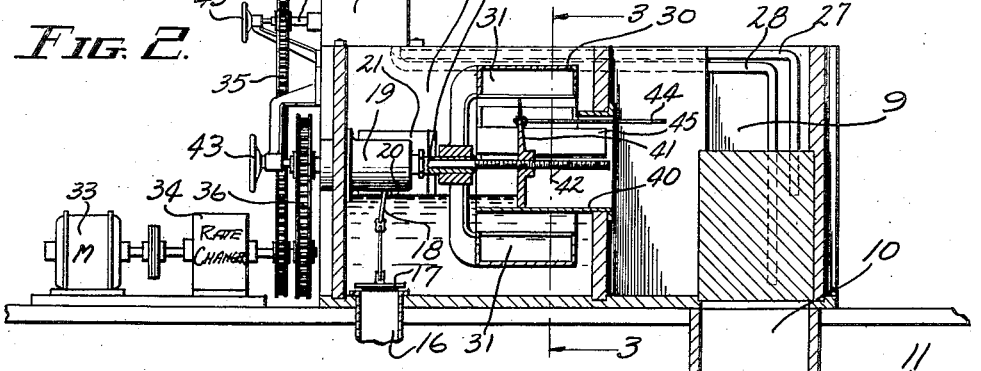
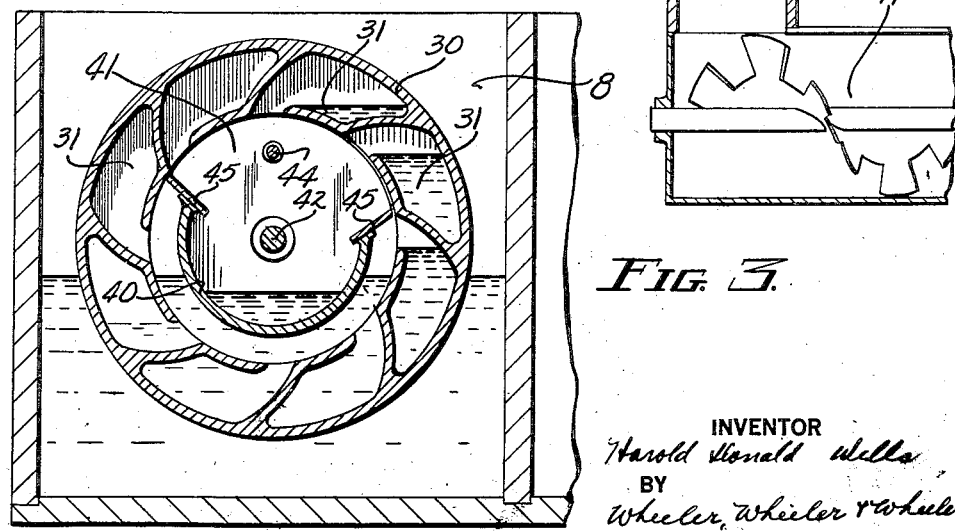
INVENTOR
Harold Donald Wells
BY
Wheeler, Wheeler & Wheeler
ATTORNEYS

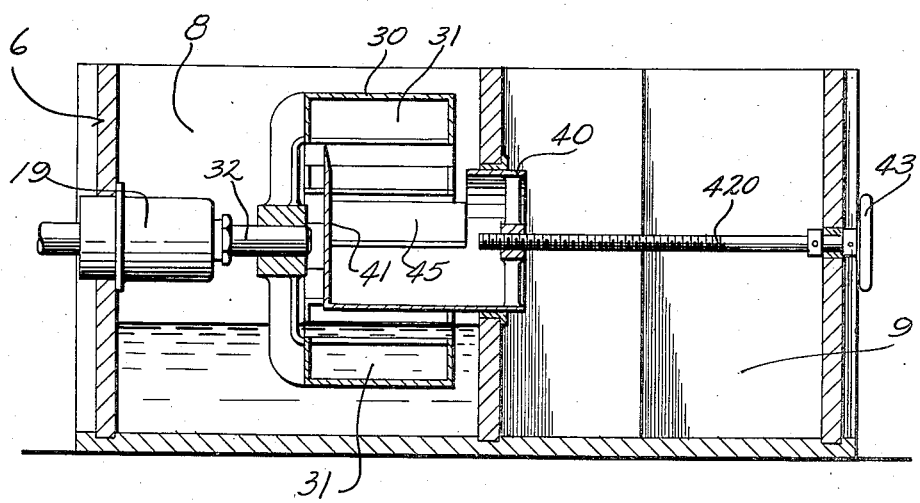
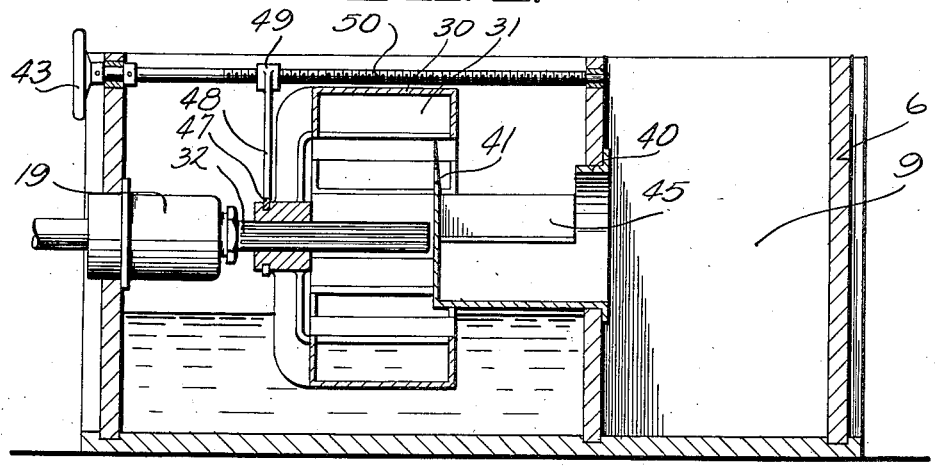

Patented June 14, 1932

1,862,643

UNITED STATES PATENT OFFICE

HAROLD DONALD WELLS, OF GLENS FALLS, NEW YORK

PROPORTIONING AND METERING APPARATUS

Application filed May 28, 1931. Serial No. 540,676.

This invention relates to improvements in proportioning and metering apparatus, the device herein disclosed; being particularly adapted for the proportioning of paper stuff.

It is the object of the invention to provide a novel and improved proportioning meter having maximum accuracy and freedom from leakage, and in which the rotation of the metering rotor is accomplished without packing or friction between the parts.

It is my further object to provide an accurate meter free of leakage problems, in which variation between minimum and maximum output can conveniently be effected from some exterior point with the machine in operation, whereby the ingredients metered and proportioned to make up the paper stuff are at all times completely under the control of the operator.

Other objects and advantages of the invention will be apparent to those skilled in the art upon examination of the accompanying drawings and descriptions.

In the drawings:

Figure 1 is a plan view diagrammatically illustrating a proportioning and metering device for paper stuff embodying this invention.

Figure 2 is a view showing the apparatus in longitudinal section upon the line indicated at 2—2 in Fig. 1.

Figure 3 is an enlarged detail view taken in cross section on the line indicated at 3—3 in Fig. 2.

Figure 4 is a fragmentary longitudinal section through a modified proportioning and metering unit embodying the invention.

Figure 5 is a view similar to Fig. 4 showing a further modification.

Like parts are identified by the same reference characters throughout the several views.

The case 6 is subdivided by partitions to provide a ground wood chamber at 7, a sulphite chamber at 8, and a mixing chamber at 9 from which an outlet port 10 leads to the agitator 11.

Chambers 7 and 8 are supplied with raw materials from the usual consistency regulators through pipes 15 and 16 respectively.

Admission of the materials into the respective chambers is controlled in each instance by a valve 17 actuated by a lever 18 pivoted to the bearing member 19 at 20 as shown in Fig. 2 and carrying a float 21. By this means an adequate and approximately constant volume of the raw materials in solution is kept in each of the chambers 7 and 8.

Additional chambers may be provided for other materials as desired. For example, chambers 25 and 26 may be provided with proportioning and metering devices discharging into pipes 27 and 28 leading to the mixing chamber 9.

In each of the chambers 7, 8, 25 and 26, is a proportioning and metering device including a rotor having buckets, preferably internal, for the ingredients, and a trough into which some or all of the contents of the buckets are discharged for delivery to the mixing chamber, the trough and the rotor being relatively axially adjustable. In a broad sense it is immaterial whether the entire trough or the end of the trough is adjustable with reference to the rotor, or whether the rotor is adjustable with reference to the end of the trough. In either case a predetermined proportion of the liquid elevated by the rotor will be discharged with great accuracy, and in either case it is possible to adjust the relative output of the device without stopping the machine or changing the relative rate of operation of the rotors in different chambers.

In the devices shown in the drawings each rotor consists of a wheel 30 of which the general proportions will be determined by the requirements of the machine. It will be noted, for example, that in chamber 7 wheel 30 is considerably longer in an axial direction than the similar wheel used in the chamber 8. Each of the wheels 30 has internal buckets 31 which, in the rotation of the wheel, will lift successively their full capacity of material from the amount contained in the chamber in which the rotor operates. It will be observed that as long as this amount is maintained at such a level as to ensure the filling of each bucket, the particular level maintained is not essential to the result.

In the construction shown in Figs. 1, 2, 3 and 4, the wheels 30 are made fast upon their respective shafts 32, which shafts are journaled in bearing members 19 and are preferably made tubular as in Figs. 1, 2, and 3 in order that the adjusting mechanism may be operated therethrough from the front of the machine instead of from the back thereof. These shafts are provided with suitable driving connections exteriorly of the case 6, whereby they may be operated from a motor 33 through a rate changing gear set preferably used at 34, the output of which may drive chains 35 and 36 to communicate motion to the several shafts 32.

One end of each of the rotors 30 is open to receive a delivery trough 40. In the construction shown in Figs. 1 to 3 inclusive the end wall 41 of trough 40 is adjustable not only with respect to the rotor, but also with respect to the trough itself, the bottom and sides of the latter being fixed. Any desired arrangement may be employed to effect relative adjustment between the end of the trough and the rotor as, for example, a screw shaft 42 may extend through the tubular drive shaft 32 provided exteriorly of casing 6 with a hand wheel 43. The inner end of shaft 42 is in threaded engagement with the end wall for the axial adjustment thereof. The exact position of the end wall is indicated to the operator by a gauge 44 suitably calibrated and projecting in close proximity to one of the partitions, or some other means of indicating accurately its relative positions.

The trough 40 preferably has outwardly extending flanges at 45 to the form of which the partition or end wall of the trough is complementary. The exact arrangement is immaterial providing the trough may with accuracy catch all of the liquid elevated by the wheel and discharged on the delivery side of the end wall or partition 41. Obviously, this partition will determine very definitely the specific proportion of the total amount of liquid elevated which will reach the mixing chamber. The fact that there is no frictional contact between the rotor and the proportioning means eliminates wear, leakage, friction and inaccuracies.

In the construction shown in Fig. 4 the arrangement is identical with that previously discussed, except that the end wall 41 is connected integrally with the rest of trough 40, and the trough as a whole moves axially with reference to the motor for proportioning purposes. In such a construction the bottom of the trough is preferably located above the level of the contents of the chamber in which the rotor operates. Fig. 4 also shows a different way of operating the trough end 41 from the rear of the machine by means of a shaft 420 which may be aligned with the drive shaft 32 but does not extend therethrough.

The device shown in Fig. 5 includes a trough of which all portions are fixed with reference to the casing. In this construction proportioning is accomplished by the axial movement of the rotor itself which, for purposes of adjustment, is splined to its driving shaft 32 and provided with a slip ring at 47 engaged by a shifting fork 48 mounted on nut 49 and operated by a screw shaft 50.

In the use of each of the constructions herein disclosed, the individual metering device is adjusted as to output by an axial movement between a bucket rotor and the end of a delivery trough. The position of the end of the trough determines with great accuracy what proportion of the contents of each bucket will be discharged through the delivery trough and what proportion of such contents will be restored to the chamber in which the rotor operates.

As between a number of metering devices of this character, their relative settings will effect accurate proportioning subject to control with the device in operation. If it is desired to regulate the entire output of the machine with reference to some other piece of apparatus as, for example, a paper making machine, the rate changer may be manipulated to change simultaneously the rate of rotation of all of the various rotors, thereby varying the output without varying the proportionate settings of the various metering devices either separately or collectively. Where a change in relative proportion of ingredients becomes necessary, however, such a change can be made by adjusting the device which meters the particular ingredient involved.

I claim:

1. A device of the character described, comprising the combination with a bucket elevator, of means for filling successive buckets of the elevator, a trough arranged to receive the discharge of the elevator and provided with a metering end wall, and means for varying the relative positions of said elevator and end wall whereby to regulate the output of said elevator through said trough.

2. The combination with means for discharging unit metered quantities of material and a deflector wall provided with a delivery conduit at one side only, of means for relatively adjusting said discharge means and deflector wall in a direction to vary the proportionate quantities of metered material passing to the delivery side of said deflector wall.

3. In a device of the character described, the combination with a rotor having internal buckets, of a trough within said rotor arranged to receive the discharge of said buckets, said trough having an end wall determinative of the proportion of discharge so received; and means for effecting relative adjustment of said end wall and rotor in a direction having an axial component.

4. In a device of the character described, the combination with a constant level chamber, of a rotor operatively mounted in said chamber and provided with peripheral buckets adapted to fill with the material in said chamber during the operation of said rotor, and a trough positioned to receive the discharge of said buckets during said operation and leading from a deflector wall within said chamber to a point outside thereof, and means for relatively adjusting said deflector wall and rotor in a direction having a component axial with respect to said rotor, whereby to vary the proportionate discharge of each bucket returned to said chamber as compared with that escaping through said trough.

5. In a device of the character described, a constant level chamber, a rotor operatively mounted therein and provided with peripheral buckets, a deflecting plate, means for producing relative axial adjustment as between said plate and rotor, means for turning said rotor in a direction to discharge the contents of said buckets across said plate, and a trough leading outwardly from said chamber from one side of said plate and adapted to deliver from said chamber the portion of the contents of each successive bucket discharged at said side of said plate, any remaining proportionate contents of each bucket being returned to said chamber.

6. In a device of the character described, the combination with a rotor provided with peripheral buckets, of a trough having a portion positioned to receive discharge from said buckets, and an end wall adjustably determinative of the portion so received.

7. In a device of the character described, the combination with a chamber and a rotor provided internally with buckets, of a fixed trough within said rotor arranged to receive the discharge from said buckets, one end of said trough leading to said chamber and the other leading outwardly therefrom, and a deflecting plate adjustable within said rotor across the path of discharge from said buckets and determinative of the relative proportions of said discharge restored to and discharged from said chamber.

8. In a device of the character described, the combination with a constant level chamber, a rotor therein provided with internal buckets, and means for actuating said rotor, of a trough having one end opening into said chamber and the other opening outwardly thereof, said trough being disposed within said rotor, and a partition adjustable axially of said rotor within said trough across the path of discharge of said buckets and determinative of the proportionate discharge of each bucket to the respective trough portions aforesaid.

9. In a device of the character described, the combination with a rotor provided with buckets, of a discharge receiving trough having a closed end, and means for producing relative axial adjustment between said rotor and trough.

10. The combination with a rotor having internal peripheral buckets and means for successively filling said buckets, of an internal trough positioned to receive the discharge from said buckets and provided with a fixed end, and means for bodily adjusting said trough and end with respect to said rotor.

11. In a device of the character described, the combination with a trough having a fixed wall, of a rotor provided with buckets, means for filling said buckets, means for turning said rotor in a direction to discharge the contents of the buckets across the trough, and means for axially adjusting said rotor with respect to said trough whereby to vary the proportionate contents of the successive buckets discharged through said trough.

12. In a device of the character described, the combination with a casing partitioned to provide metering chambers and a mixing chamber, of bucketed rotors within the metering chambers, troughs leading from the path of discharge of the buckets of said rotors and the mixing chamber, deflecting walls associated with said troughs, and means for relatively varying one of said walls with respect to its rotor in an axial direction whereby to vary the proportionate discharge of the buckets of said last mentioned rotor through said trough.

13. In a device of the character described, the combination with a source of power, a rate changing device and a plurality of metering devices driven from said source through said rate changing device, of means for varying the relative output of one of said metering devices with respect to another, the total output of said metering devices being simultaneously variable in the same proportion through manipulation of said rate changer.

14. In a device of the character described, the combination with a rotor, a tubular drive shaft therefor, buckets carried by said rotor and a trough arranged to receive discharge from said buckets and provided with a deflecting wall, of means operating through said shaft for varying the relative positions of said wall and bucket whereby to vary the proportionate quantities of the discharge of each bucket delivered through said trough as compared with the quantities not so delivered.

HAROLD DONALD WELLS.